(12) United States Patent
Takahashi

(10) Patent No.: US 8,288,985 B2
(45) Date of Patent: Oct. 16, 2012

(54) CONTROL APPARATUS FOR ELECTRIC ROTATING MACHINE

(75) Inventor: Tomoya Takahashi, Anjo (JP)

(73) Assignee: Denso Corporation, Kariya (JP)

(*) Notice: Subject to any disclaimer, the term of this patent is extended or adjusted under 35 U.S.C. 154(b) by 292 days.

(21) Appl. No.: 12/848,589

(22) Filed: Aug. 2, 2010

(65) Prior Publication Data

US 2011/0031907 A1 Feb. 10, 2011

(30) Foreign Application Priority Data

Aug. 5, 2009 (JP) .................................. 2009-182425

(51) Int. Cl.
*H02P 27/02* (2006.01)
(52) U.S. Cl. ...... 318/812; 318/432; 318/434; 318/400.3
(58) Field of Classification Search .................. 318/812, 318/432, 434, 139
See application file for complete search history.

(56) References Cited

U.S. PATENT DOCUMENTS

| | | | | |
|---|---|---|---|---|
| 4,458,471 | A * | 7/1984 | Herwig ....................... 56/10.2 G |
| 6,208,109 | B1 * | 3/2001 | Yamai et al. .................. 318/716 |
| 7,023,168 | B1 | 4/2006 | Patel et al. |
| 7,243,006 | B2 * | 7/2007 | Richards ....................... 700/286 |
| 7,262,536 | B2 * | 8/2007 | Rahman et al. ........... 310/156.35 |
| 7,332,837 | B2 * | 2/2008 | Ward et al. ....................... 310/54 |
| 7,586,286 | B2 * | 9/2009 | Cheng et al. .................... 318/807 |
| 7,592,765 | B2 * | 9/2009 | Rahman et al. ........... 318/400.02 |
| 7,592,766 | B2 * | 9/2009 | Patel et al. ............... 318/400.02 |
| 2002/0113570 | A1 | 8/2002 | Heikkila |
| 2009/0160381 | A1 | 6/2009 | Imura et al. |

FOREIGN PATENT DOCUMENTS

| | | |
|---|---|---|
| JP | A-09-191697 | 7/1997 |
| JP | A-2000-037098 | 2/2000 |
| JP | A-2000-278982 | 10/2000 |
| JP | A-2002-209398 | 7/2002 |
| JP | A-2007-259607 | 10/2007 |
| JP | A-2008-228419 | 9/2008 |
| JP | A-2009-124811 | 6/2009 |
| JP | A-2009-171825 | 7/2009 |

OTHER PUBLICATIONS

Office Action issued in Japanese Patent Application No. 2009-182425 dated May 24, 2011 (with translation).

* cited by examiner

*Primary Examiner* — Rita Leykin
(74) *Attorney, Agent, or Firm* — Oliff & Berridge, PLC

(57) ABSTRACT

The control apparatus controls a controlled variable of the electric rotating machine by manipulating an output voltage of a power converter circuit including switching elements operated to connect positive and negative terminals of a DC power source to corresponding terminals of the electric rotating machine. The control apparatus includes a prediction section configured to predict the controlled variable for each of a plurality of cases where the power converter circuit is set in a corresponding one of a plurality of predetermined operating states, a feedforward control section configured to set a command value of the controlled variable in accordance with the voltage of the DC power source and the electrical angular velocity of the electric rotating machine, and a manipulation section configured to select one of the predetermined operating states depending on a result of evaluation by an evaluation function receiving the predicted controlled variable and the command value.

14 Claims, 12 Drawing Sheets

| VOLTAGE VECTOR | SWITCHING ELEMENTS WHICH ARE ON | | |
|---|---|---|---|
| | U-PHASE | V-PHASE | W-PHASE |
| V0 | LOW SIDE | LOW SIDE | LOW SIDE |
| V1 | HIGH SIDE | LOW SIDE | LOW SIDE |
| V2 | HIGH SIDE | HIGH SIDE | LOW SIDE |
| V3 | LOW SIDE | HIGH SIDE | LOW SIDE |
| V4 | LOW SIDE | HIGH SIDE | HIGH SIDE |
| V5 | LOW SIDE | LOW SIDE | HIGH SIDE |
| V6 | HIGH SIDE | LOW SIDE | HIGH SIDE |
| V7 | HIGH SIDE | HIGH SIDE | HIGH SIDE |

CONTROL APPARATUS FOR ELECTRIC ROTATING MACHINE

This application claims priority to Japanese Patent Application No. 2009-182425 filed on Aug. 5, 2009, the entire contents of which are hereby incorporated by reference.

BACKGROUND OF THE INVENTION

1. Field of the Invention

The present invention relates to a control apparatus for an electric rotating machine, the control apparatus being configured to control the controlled variables of the electric rotating machine by adjusting the output voltage of a power converter circuit including switching elements which are operated to connect positive and negative terminals of a DC power source to corresponding terminals of the electric rotating machine.

2. Description of Related Art

Such control apparatuses include the one which performs triangular wave comparison PWM control in which, in order to feedback-control the currents flowing through the respective phases of a three-phase motor at their command values, command voltages of the respective phases are calculated, and switching elements of an inverter are operated in accordance with comparison results between each of the calculated command values and a triangular wave carrier signal.

Further, in recent years, there is proposed the one which performs the so-called model predictive control in which the currents flowing through the respective phases of a three-phase motor are predicted for each of different operating states of an inverter, and the inverter is operated in one of the operating states in which the deviation between each predicted current and a command current is minimum. For example, refer to Japanese Patent Application Laid-Open No. 2008-228419 (Patent document 1). According to the above apparatus, since the inverter is operated such that the behavior of the currents predicted on the basis of the output voltage of the inverter is optimized, the followability to the command current during a transient period can be improved compared to the apparatus which performs the triangular wave comparison PWM control. Accordingly, the model predictive control is expected to be useful for a control apparatus which is required to exhibit high followability during a transient period, for example, when it is used for a motor-generator which is mounted on a vehicle as a main engine of the vehicle.

Incidentally, Japanese Patent No. 3727268 (Patent document 2) also describes a control apparatus based on such mode prediction control.

However, in the control apparatus which performs the model predictive control, although the output current of an inverter can be controlled at a command current within the range in which the modulation index is smaller than 1, that is, an average amplitude between output lines of the power converter circuit is smaller than the voltage of the DC power source, it is difficult to control the output current at the command value in the overmodulation range in which the modulation index exceeds 1 due to the constraint depending on the input voltage of the inverter.

SUMMARY OF THE INVENTION

The present invention provides a control apparatus for an electric rotating machine configured to control at least one controlled variable of the electric rotating machine by manipulating an output voltage of a power converter circuit including switching elements operated at a set modulation index to connect positive and negative terminals of a DC power source to corresponding terminals of the electric rotating machine, the control apparatus comprising:

a prediction section configured to predict a first value of the controlled variable of the electric rotating machine for each of a plurality of cases where the power converter circuit is set in a corresponding one of a plurality of predetermined operating states;

a feedforward control section including a calculating section to calculate, in accordance with a voltage of the DC power source and electrical angular velocity of the electric rotating machine inputted thereto, a second value of the controlled variable of the electric rotating machine as a target value to be set depending on the voltage of the DC power source at which an average value of magnitude of the output voltage of the power converter circuit is controlled, the feedforward control section being configured to set, as a command value of the at least one controlled variable, at least one of the second value of the controlled variable calculated by the calculating section and a third value of another controlled variable calculable from the second value of the controlled variables; and a manipulation section configured to select one of the predetermined operating states of the power converter circuit depending on a result of evaluation of an evaluation function receiving the first value of the controlled variable predicted by the prediction section and the command value set by the feedforward control section as input parameters thereof, and to manipulate the converter circuit to be brought to the selected operating state.

According to the present invention, there is provided a control apparatus for an electric rotating machine capable of appropriately performing the model predictive control even in the overmodulation range.

Other advantages and features of the invention will become apparent from the following description including the drawings and claims.

PREFERRED EMBODIMENTS OF THE INVENTION

First Embodiment

Figure 1:
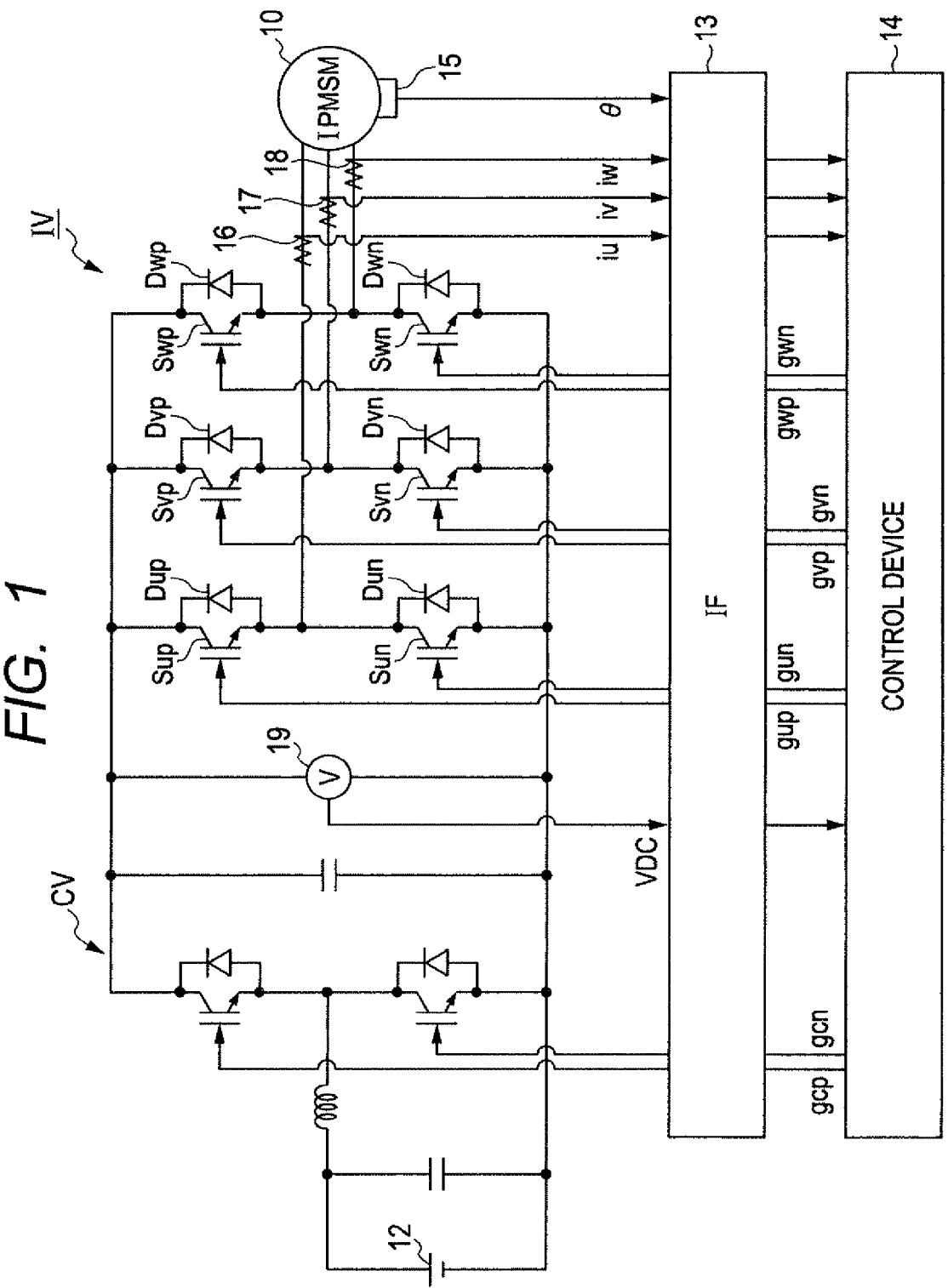
FIG. 1 is a diagram showing the structure of a control system for an electric rotating machine including a control apparatus according to a first embodiment of the invention.

FIG. 1 is a diagram showing the overall structure of a control system for a motor-generator 10 mounted on a hybrid vehicle, the system including a control apparatus according to a first embodiment of the invention. The motor-generator 10 is a salient-pole type electric rotating machine which operates as a three-phase permanent magnet synchronous motor. That is, the motor-generator 10 is an IPMSM (Interior Permanent Magnet Synchronous Motor).

The motor-generator 10 is connected to a high voltage battery 12 through an inverter IV and a step-up converter CV. The step-up converter CV steps up the output voltage of the high-voltage battery 12 (288 V, for example) up to a predetermined voltage (666 V, for example). The inverter IV is constituted of a series connection of switching elements Sup and Sun, a series connection of switching elements Svp and Svn, and a series connection of switching elements Swp and Swn, these series connections being connected to the U, V and W phases of the motor-generator 10, respectively. In this embodiment, as these switching elements Sup, Sun, Svp, Svn, Swp and Swn, IGBTs (Insulated Gate Bipolar Transistors) are used. These switching elements Sup, Sun, Svp, Svn, Swp and Swn are anti-parallel connected with diodes Dup, Dun, Dvp, Dvn, Dwp and Dwn, respectively.

As means for detecting the operating states of the motor-generator 10 and the inverter IV, this embodiment includes a rotation angle sensor 15 to detect the rotational angle (electric angle θ) of the motor-generator 10, current sensors 16, 17 and 18 to measure the phase currents iu, iv and iw flowing through the respective phases of the motor-generator 10, and a voltage sensor 19 to measure the input voltage of the inverter IV (power supply voltage VDC).

The sensor signals from these sensors are inputted to a control device 14 constituting a low-voltage system through an interface 13. The control device 14 generates operation signals to operate the inverter IV and the converter CV in accordance with the sensor signals. In more detail, the control device 14 generates operation signals gup, gun, gyp, gvn, gwp and gwn to control the switching elements Sup, Sun, Svp, Svn, Swp and Swn, respectively, and generates operation signals gcp and gcn to control the two switching elements of the step-up converter CV.

The control device 14 operates the inverter IV in order to control the controlled variables of the motor-generator 10 at their command values. This embodiment performs model predictive control in which each controlled variable of the motor-generator 10 is predicted for each of different operating states of the inverter IV, and the inverter IV is operated in one of the operating states in which the predicted controlled variable is closest to the corresponding command value. Next, explanation is given to the operating states of the inverter IV.

Figures 2A, 2B:
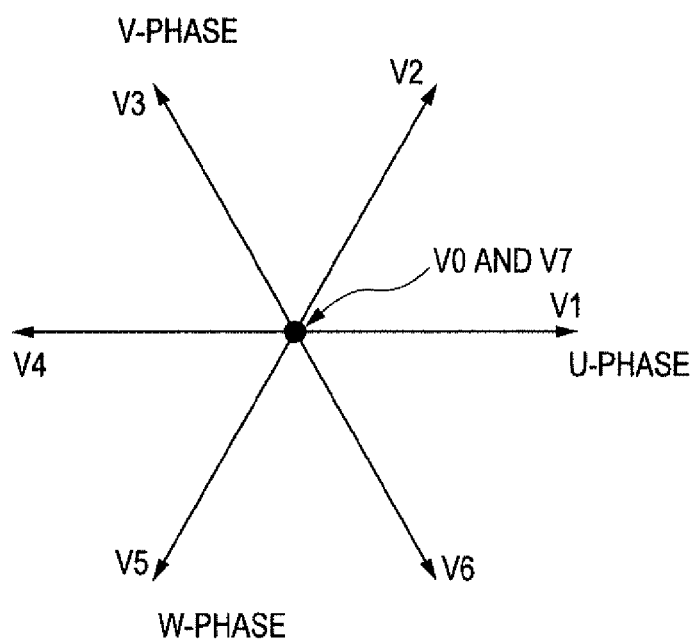
FIGS. 2A and 2B are diagrams showing operating states of an inverter included in the control system of the first embodiment.

The operating state of the inverter IV can be represented by eight voltage vectors V0 to V7 shown in FIG. 2A. For example, the voltage vector V0 represents the state in which the switching elements Sun, Svn and Swn on the low voltage side (indicated by "low side" in FIG. 2A) are on, and the voltage vector V7 represents the state in which the switching elements Sup, Svp and Swp on the high voltage side (indicated by "high side" in FIG. 2A) are on. Each of the voltage vectors V0 and V7 is a voltage vector for short-circuiting all of the respective phases of the motor-generator 10, causing the voltage applied to the motor-generator 10 to be 0. Accordingly, they are called "zero vector". The other six voltage vectors V1 to V6 define different states in each of which at least one of the switching elements on the upper-arm side (high voltage side) and at least one of the switching elements on the lower-arm side (low voltage side) are on. Accordingly, they are called "non-zero vector". As shown, in FIG. 2B, the voltage vectors V1, V3 and V5 represent the states in each of which the switching element on the high voltage side of one of the U, V or W phase is on.

In this embodiment, the controlled variables of the motor-generator 10 are predicted for each of the eight operating states (voltage vectors V0 to V7) of the inverter IV, and one of the voltage vectors is selected according to which the operating state of the inverter IV should be set in accordance with the prediction results.

Figure 3:
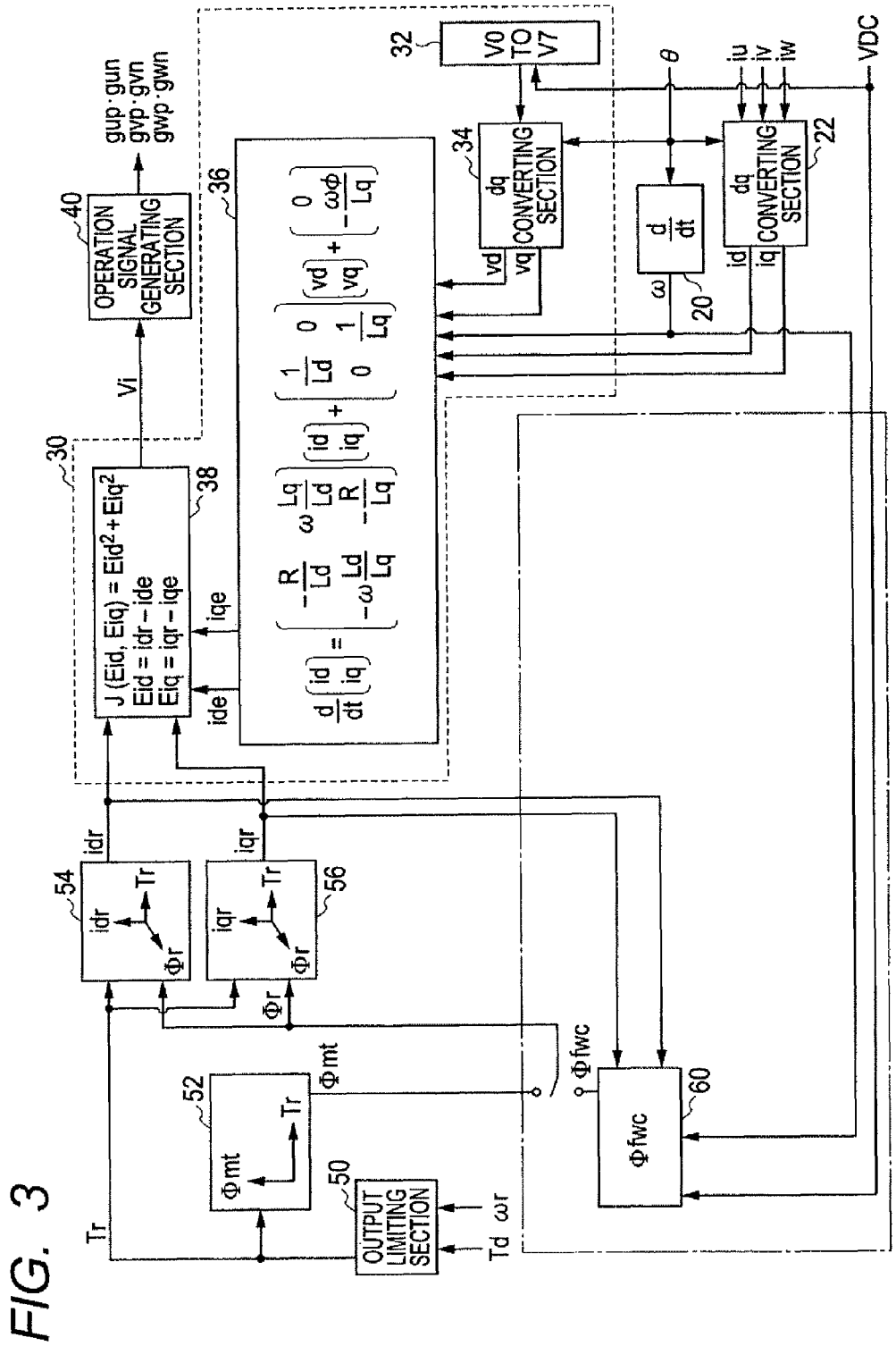
FIG. 3 is a functional block diagram explaining the operation of the control apparatus of the first embodiment.

FIG. 3 is a functional block diagram explaining the process of the model predictive control performed in this embodiment.

A velocity calculating section 20 calculates the electrical angular velocity ω on the basis of the electric angle θ of the motor-generator 10 measured by the rotation angle sensor 15. A dq converting section 22 converts the phase currents measured by the current sensors 16, 17 and 18 into currents on the dq-axes as actual currents id and iq.

The electrical angular velocity ω and the actual currents id and iq are inputted to a model predictive control section 30. An operating state setting section 32 sets the operating state of the inverter IV by use of the voltage vector V0 to V7. A dq converting section 34 dq-converts the voltage vector set by the operating state setting section 32 to calculate the voltage vector (vd, vq) in the dq coordinate system. To perform the above conversions, each of the voltage vectors V0 to V7 shown in FIG. 2A may be represented such that the "high side" takes a value of VDC/2, and the "low side" takes a value of −VDC/2. In this case, the voltage vector 0 is represented by (−VDC/2, −VDC/2, −VDC/2), and the voltage vector 1 is represented by (VDC/2, −VDC/2, −VDC/2), for example.

A predicting section 36 predicts the currents id and iq when the inverter IV is brought to the operating state set by the operating state setting section 32 on the basis of the voltage vector (vd, vq), actual currents id and iq, and electrical angular velocity ω. Here, the following voltage equations (c1) and (c2) are solved with respect to the differential terms of the currents to obtain the following state equations (c3) and (c4), and the currents one step ahead are predicted by discretizing the obtained state equations (c3) and (c4).

$$vd = (R+pLd)id - \omega Lq iq \tag{c1}$$

$$Vq = \omega Ld id + (R+pLq)iq + \omega \phi \tag{c2}$$

$$pid = -(R/Ld)id + \omega(Lq/Ld)iq + vd/Ld \tag{c3}$$

$$piq = -\omega(Ld/Lq)id - (Rd/Lq)iq + vq/Lq - \omega\phi/Lq \tag{c4}$$

In the equations (c1) and (c2), R denotes the resistance, p denotes the differential operator, Ld denotes the d-axis inductance, Lq denotes the q-axis inductance, and ω denotes the flux linkage constant.

The prediction of the currents is performed for each of the operating states set by the operating state setting section 32.

An operating state determining section 38 determines the operating state of the inverter IV in accordance with the predicted currents ide and iqe predicted by the predicting section 36, and the command currents idr and iqr inputted thereto. Here, each of the operating states set by the operating state setting section 32 is evaluated by use of an evaluation function J, and the operating state having the highest evaluation is selected.

In this embodiment, as the evaluation function J, there is adopted such a function that its value is larger when the evaluation is lower. In this embodiment, the evaluation function J is the inner product between the command current vector Idqr (idr, iqr) and the predicted current vector Idqe (ide, iqe). Since the variation in each component between the command current vector Idqr and the predicted current vector Idqe takes a positive or negative value, the evaluation function J shows that the evaluation is lower when the variation in each component between the command current vector Idqr and the predicted current vector Idqe is larger.

The thus determined operating state of the inverter IV (the voltage vector Vi) is outputted to an operation signal generating section 40. The operation signal generating section 40 generates the operation signals to bring the inverter IV to the determined operating state indicated by the voltage vector Vi. The above command currents idr and iqr are set to enable maximum torque per ampere control in which a maximum torque is generated by a minimum current.

An output limiting section 50 receives demand torque Td required of the motor-generator 10 set in accordance with torque demand from the vehicle and an electrical angular velocity command value ωr, and calculates a torque command value Tr such that the output power of the motor-generator 10 does not exceed a predetermined allowable maximum output. The torque command value Tr coincides with the demand torque Td when the product of the demand torque Td and the electrical angular velocity command value ωr does not exceed the allowable maximum output.

A maximum torque flux-command-value setting section 52 sets a flux norm command value Φmt to perform the maximum torque per ampere control in accordance with the torque command value Tr inputted thereto. The flux norm command value Φmt is set as a command value of the flux norm (flux norm command value Φr) of the motor-generator 10 during the maximum torque per ampere control.

On the other hand, a command current setting section 54 sets the command current idr on the d-axis in accordance with the flux norm command value Φr and the torque command value Tr inputted thereto. A command current setting section 55 sets the command current iqr on the q-axis in accordance with the flux norm command value Φr and the torque command value Tr inputted thereto. The command currents idr and iqr are used as input parameters of the evaluation function J. When the maximum torque per ampere control is not performed, field weakening control is performed. In this embodiment, the field weakening control is performed as feedback control to keep the average value of magnitude of the output voltage of the inverter IV at a target value. Although the average value of magnitude of the output voltage of the inverter IV periodically changes in polarity, it can be quantified with respect to its amplitude by use of an appropriate quantifying method. In this embodiment, as the method, modulation index M is used. Here, the modulation index M is the Fourier coefficient of the fundamental wave component of the output voltage of the inverter IV. The fundamental wave component here is a sine wave having the frequency of $2\pi/\omega$, ω being the electrical angular velocity of the motor-generator 10. In this embodiment, to calculate the Fourier coefficient, the amplitude center of the fundamental wave and the variation center of the output voltage of the inverter IV are brought in line.

In more detail, a field weakening flux-command-value setting section 60 calculates, in accordance with the actual currents id and iq, the electrical angular velocity ω and the power supply voltage VDC inputted thereto, a flux norm command value Φfwc as a feedforward manipulated variable. The flux norm command value Φfwc is a flux linkage norm as a feedforward manipulated variable to control the average value of magnitude of the output voltage at the target value. Here, a method of calculating the flux norm command value Φfwc is explained.

The terminal voltage Vam of the motor-generator 10 is represented by the following equation (c5) when the induced voltage and the current is Vo and I, respectively.

$$Vam = Vo + RI \quad (c5)$$

The following equation (c6) is derived from the above equation (c5) when the angle θf between the d-axis positive direction and the flux linkage vector is represented by arctan (Lqiq/(Ldid+φ)).

$$Vam^2 = \{Vo \cos(\theta f \pm \pi/2) + Rid\}^2 + \{Vo \sin(\theta f \pm \pi/2) + Riq\}^2 \quad (c6)$$

In the above equation (c6), the positive sign, corresponds to the normal rotation of the motor-generator 10, and the negative sign corresponds to the reverse rotation of the motor-generator 10.

By solving the above equation (c6) with respect to the induced voltage Vo, the following equation (c7) can be obtained.

$$Vo = -R(-id\sin(\theta f \pm \pi/2) + iq\cos(\theta f \pm \pi/2)) + \sqrt{R^2(-id\sin(\theta f \pm \pi/2) + iq\cos(\theta f \pm \pi/2))^2 + Vam^2 - R^2 I^2} \quad (c7)$$

Since $|\omega| \cdot \Phi fwc = Vo$, the above equation (c7) can be transformed to following equation (c8) representing the flux norm command value Φfwc.

$$\Phi fwc = \frac{-R(-id\sin(\theta f \pm \pi/2) + iq\cos(\theta f \pm \pi/2)) + \sqrt{R^2(-id\sin(\theta f \pm \pi/2) + iq\cos(\theta f \pm \pi/2))^2 + Vam^2 - R^2 I^2}}{|\omega|} \quad (c8)$$

The thus calculated flux norm command value Φfwc is corrected by the manipulated variable to feedback-control the average value of magnitude of the output voltage, to be the final flux norm command value Φr.

Figure 4:
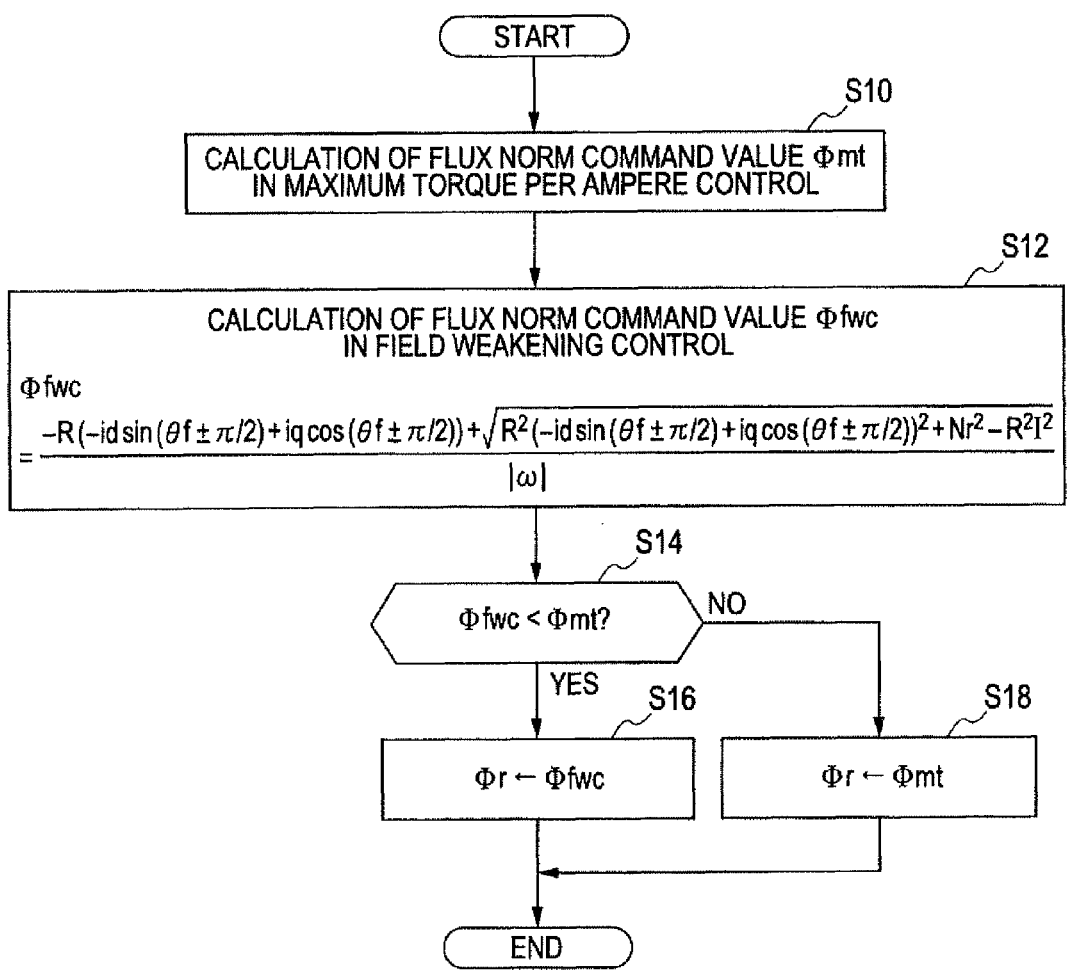
FIG. 4 is a flowchart showing the switching process between maximum torque per ampere control and field weakening control performed by the control apparatus of the first embodiment.

FIG. 4 is a flowchart showing the operation of switching between the flux norm command value Φmt in the maximum torque per ampere control and the flux norm command value Φfwc in the field weakening control. This process is performed repeatedly at regular time intervals by the control device 14.

This process begins by calculating, at step S10, the flux norm command value Φmt for the maximum torque per ampere control. At subsequent step S12, the flux norm command value Φfwc for the field weakening control is calculated. Here, the flux norm command value Φfwc is calculated in accordance with equation (c8) where the terminal voltage Vam has been replaced by a norm target value Nr. The norm target value Nr is a product of the power supply voltage VDC and the Mr·√(3/8), where Mr is a modulation index command value. Here, the modulation index command value Mr is used. The term of Mr·√(3/8) is a command value of a voltage utilization rate. Like the modulation index, the voltage utilization rate is a physical quantity indicating the magnitude of the quantified output voltage vector of the inverter IV.

In this embodiment, the modulation index command value Mr is set larger than 1 and smaller than the modulation index of 1.27 in the rectangular wave control. The first reason is that the sine wave voltage to actualize the maximum torque per ampere control can be sufficiently modeled by the output voltage of the inverter IV when the modulation index is lower than 1. The second reason is that the maximum value of the modulation index is equal to the value of the modulation index when the rectangular wave control is performed.

At subsequent step S14, it is determined whether or not the flux norm command value Φfwc in the field weakening control is smaller than the flux norm command value Φmt in the maximum torque per ampere control. This step S14 is provided for determining whether or not a condition to use the flux norm command value Φfwc for the field weakening control has been satisfied. If the determination result at step S14 is affirmative, the process proceeds to step S16 where the flux norm command value Φr as the command value (input parameter of the evaluation function J) of the controlled variable of the motor-generator 10 is set as the flux norm command value Φfwc for the field weakening control. If the determination result at step S14 is negative, the process proceeds to step S18 where the flux norm command value Φr is set as the flux norm command value Φmt for the maximum torque per ampere control. According to the above process, when the average value of magnitude of the output voltage of the inverter IV is kept at around the norm target value Nr, the flux norm command value Φr is selected.

In the above embodiment, the target value is calculated when the average amplitude between the output lines of the inverter is larger than the power supply voltage VDC, and the feedforward control is started when the average amplitude between the output lines of the inverter is larger than the voltage of the power supply voltage.

When step S16 or step S18 is completed, the process is terminated.

The first embodiment described above provides the following advantages.

(1) The input parameters of the evaluation function J are manipulated by a feedforward manipulated variable so that the average value of magnitude of the output voltage of the inverter IV is kept at the target value set in accordance with the power supply voltage VDC. This makes it possible to control the torque of the motor-generator 10 at the torque command value Tr, while setting the target value to the average value of magnitude of the output voltage of the inverter IV. Also in the overmodulation range in which the modulation index exceeds 1, there exist a plurality of currents on the dq-axes to control the actual torque at the torque command value Tr. Accordingly, there is a tendency that the current flowing through the motor-generator 10 increases when the above constraint with respect to the average value of magnitude of the output voltage is removed.

(2) The feedforward manipulated variable to keep the average value of magnitude of the output voltage of the inverter IV is set to the flux norm command value Φfwc. Since the magnitude of the flux linkage can be obtained by analytical approximate calculation by use of a model with respect to the voltage applied to the motor-generator 10, it is possible to reduce man-hour for designing the feedforward control means.

(3) The target value of the average value of magnitude of the output voltage is set to the average value of magnitude of the output voltage when the modulation index exceeds 1. This makes it possible to make the fundamental component of the voltage applied to the motor-generator 10 as large as possible.

(4) The target value of the average value of magnitude of the output voltage is set to the average value of magnitude of the output voltage when the modulation index is smaller than the modulation index to perform the rectangular wave control. This makes it possible to maintain the controllability of the feedforward control at high level.

(5) The feedforward control of the average value of magnitude of the output voltage is started when the modulation index reaches a predetermined value larger than 1. This makes it possible to increase the frequency that the maximum torque per ampere control is performed.

(6) The control in accordance with the flux norm command value Φfwc is performed when the flux norm command value Φfwc in the field weakening control is smaller than the flux norm command value Φmt in the maximum torque per ampere control. This makes it possible to perform the maximum torque per ampere control preferentially.

(7) The command currents idr and iqr are calculated on the basis of the torque command value Tr and the flux norm command value Φr of the motor-generator 10. This makes it easy to design the evaluation function by setting the currents on the dq-axes as the input parameters of the evaluation function, while setting the flux linkage as the manipulation object of the feedforward control.

Second Embodiment

Next, a second embodiment of the invention is described with particular emphasis on the difference with the first embodiment.

The second embodiment additionally performs the process to feedback-control the currents flowing through the motor-generator 10 at the command currents idr and iqr.

Figure 5:
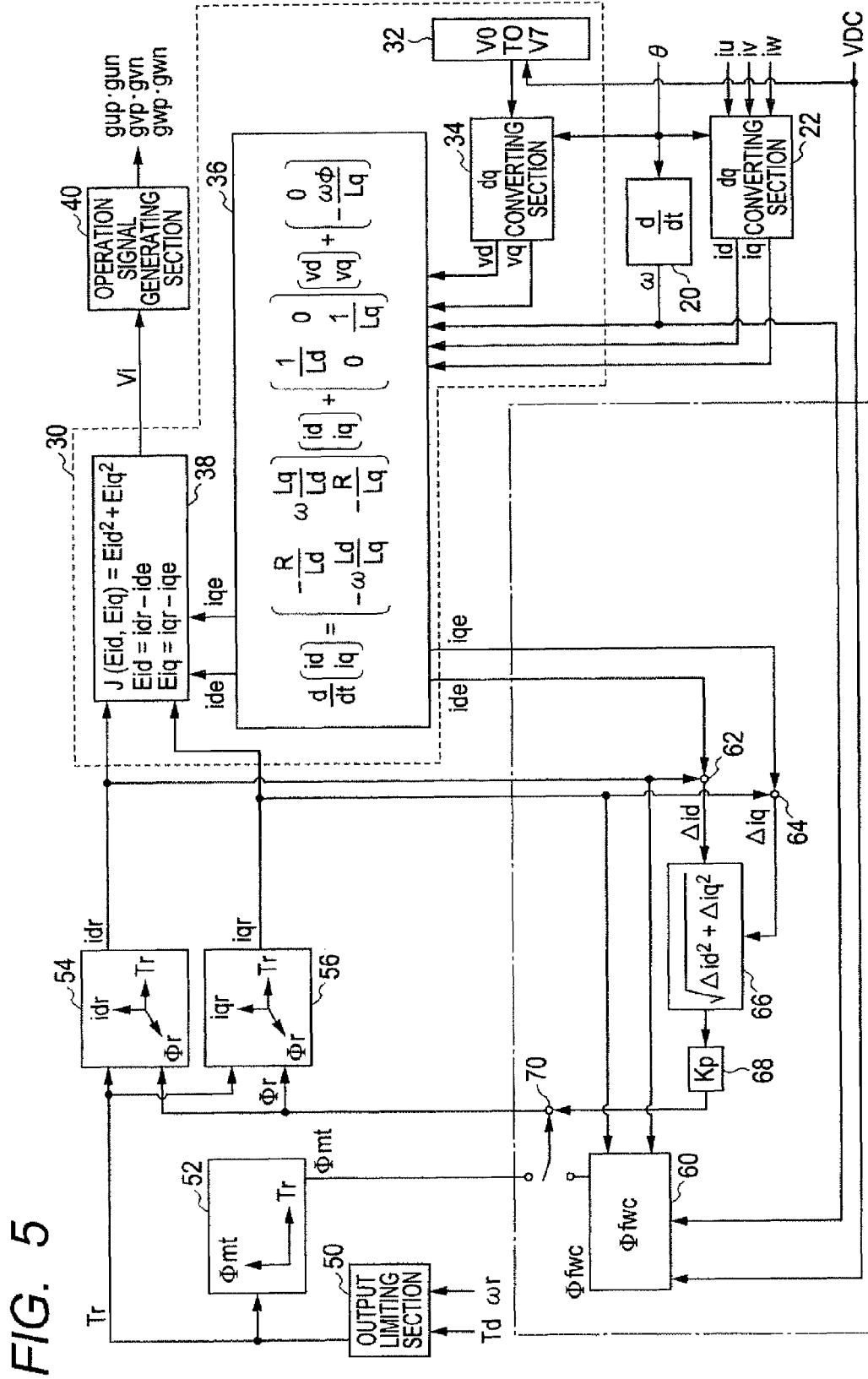
FIG. 5 is a functional block diagram explaining the operation of a control apparatus according to a second embodiment of the invention.

FIG. 5 is a functional block diagram explaining the process of the model predictive control performed in this embodiment. In FIG. 5, the same reference numerals or characters identical to those shown in FIG. 3 represent the same components.

As shown in FIG. 5, a deviation calculating section 62 calculates the d-axis deviation Δid by subtracting the predicted current ide from the command current idr on the d-axis. A deviation calculating section 64 calculates the q-axis deviation Δiq by subtracting the predicted current iqe from the command current iqr on the q-axis. A deviation norm calculating section 66 receives the d-axis deviation Δid and the q-axis deviation Δiq, and calculates the norm of the current deviation on the dq-axes. A proportional controller 68 is a proportional element to feedback-control the output of the deviation norm calculating section 66 at 0. A correcting section 70 corrects the output of the field weakening flux-command-value setting section 60 by the output of the proportional controller 68.

As a result, the flux norm command value Φr has a value corrected from the basic value set to control the average value of magnitude of the output voltage at the target value, such that the currents flowing through the motor-generator 10 is feedback-controlled at the command currents idr and iqr.

According to the second embodiment, other than the above advantages (1) to (7) provided by the first embodiment, the following advantage can be obtained.

(8) The flux norm command value Φfwc is manipulated to feedback-control the d-axis current and the q-axis current of the motor-generator 10 at their command values. This makes it possible to prevent that the current flowing through the motor-generator 10 from deviating from the command value.
Third Embodiment Next, a third embodiment of the invention is described with particular emphasis on the difference with the first embodiment.

In the third embodiment, the flux norm command value Φfwc is decrease-corrected on the basis of the difference between the current flowing through the motor-generator and the COT wand currents idr or iqr.

Figure 6:
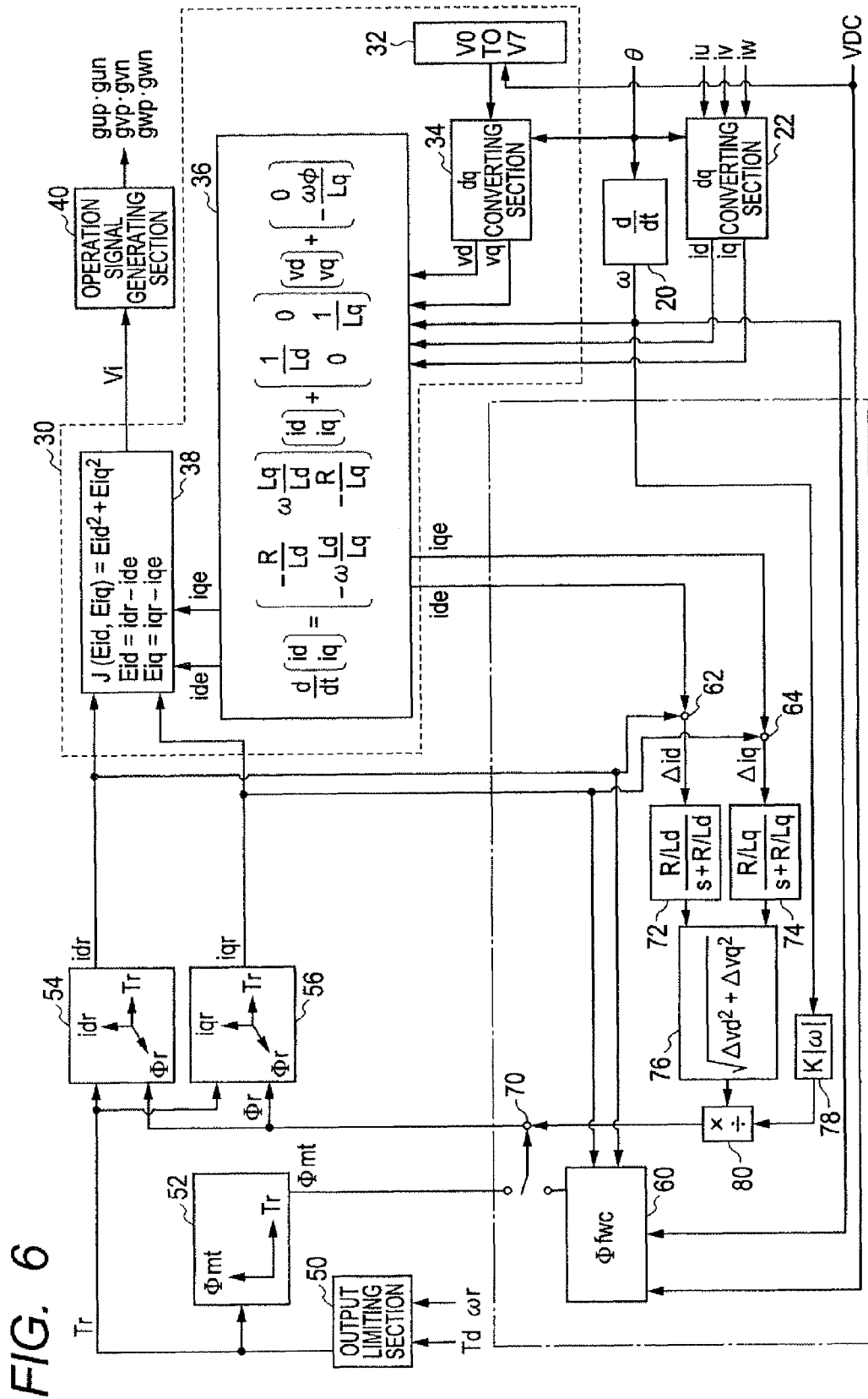
FIG. 6 is a functional block diagram explaining the operation of a control apparatus according to a third embodiment of the invention.

FIG. 6 is a functional block diagram explaining the process of the model predictive control performed in this embodiment. In FIG. 6 the same reference numerals or characters identical to those shown in FIG. 3 represent the same components.

The d-axis deviation Δid calculated by the deviation calculating section 62 is inputted to a first-order filter 72. The q-axis deviation Δiq calculated by the deviation calculating section 64 is inputted to a first-order filter 74. A deviation norm calculating section 76 calculates, on the basis of the outputs of the first-order filters 72 and 74, a voltage norm deviation representing the difference between the terminal voltage of the motor-generator 10 calculated from the command currents idr and iqr, and the terminal voltage of the motor-generator 10 calculated from the current flowing through the motor-generator 10. The process of this calculation is explained in detail in the following.

The Δvd given by the following equation (c9) represents the difference between the d-axis voltage when the command currents idr and iqr are substituted into equation (c1) as the actual currents id and iq, and the d-axis voltage when the predicted currents ide and iqe are substituted into equation (c1) as the actual currents id and iq. Further, Δvq given by the following equation (c10) represents the difference between the q-axis voltage when the command currents idr and iqr are substituted into equation (c2) as the actual currents id and iq, and the q-axis voltage when the predicted currents ide and iqe are substituted into equation (c2) as the actual currents id and iq.

$$\Delta vd = (R+sLd)\Delta id - \omega Lq \Delta iq \qquad (c9)$$

$$\Delta vq = (R+sLq)\Delta iq - \omega Ld \Delta id \qquad (c10)$$

When the filtering characteristic of the first-order filter 72 is represented by $(R/Ld)/(s+R/Ld)$, the outputs of the first-order filter 72 applied with the voltage deviation Δvd represented by the equation (c9) is given by the following equation (c11). Likewise, when the filtering characteristic of the first-order filter 74 is represented by $(R/Lq)/(s+R/Lq)$, the outputs of the first-order filter 74 applied with the voltage deviation Δvq represented by the equation (c10) is given by the following equation (c12).

$$\Delta vd = R\Delta id - \omega Lq \Delta iq(R/Ld)/(s+R/Ld) \qquad (c11)$$

$$\Delta vq = R\Delta iq - \omega Ld \Delta id(R/Lq)/(s+R/Lq) \qquad (c12)$$

The sum of the square of the left-hand side of equation (c11) and the square of the left-hand side of equation (c12) makes the output of the deviation norm calculating section 76. The left-hand side of equation (c11) can be assumed to be the average value of the terminal voltage necessary to cause the command currents idr and iqr to flow through the motor-generator 10. The left-hand side of equation (c12) can be assumed to be the average value of the terminal voltage necessary to cause the predicted currents ide and iqe to flow through the motor-generator 10. Accordingly, the output of the deviation norm calculating section 76 is a parameter to quantify the difference of these average values.

On the other hand, a gain setting section 78 calculates a gain having a value corresponding to the absolute value of the electrical angular velocity ω in accordance with the electrical angular velocity ω inputted thereto. A correction amount calculating section 80 sets the decrease correction amount to a value larger than 0 when the terminal voltage calculated from the predicted currents ide and iqe is larger than that calculated from the command currents idr and iqr. In more detail, the decrease correction amount is set to the output value of the deviation norm calculating section 76 divided by the gain calculated by the gain setting section 78. Accordingly, the flux norm command value ωfwc is decrease-corrected at the correcting section 70 by a value which is proportional to the output value of the deviation norm calculating section 76 and inversely proportional to the absolute value of the electrical angular velocity ω.

It is preferable that the gain set by the gain setting section 78 has a value larger than the electrical angular velocity as a critical point at which the demand torque Td and the torque command value Tr differ from each other, and smaller than the maximum value of the electrical angular velocity.

According to the third embodiment, other than the above advantages (1) to (7) provided by the first embodiment, the following advantage can be obtained.

(9) When the terminal voltage calculated from the current flowing through the motor-generator 10 is larger than that calculated from the command currents idr and iqr, the flux norm command value Φfwc is decrease-corrected by an amount corresponding to the difference therebetween. This makes it possible to prevent the current flowing through the motor-generator 10 from deviating from the command values idr or iqr.
Fourth Embodiment Next, a fourth embodiment of the invention is described with particular emphasis on the difference with the first embodiment.

The fourth embodiment additionally performs the process to manipulate the flux norm command value Φfwc in order to feedback-control the torque of the motor-generator 10 at the torque command value Tr.

Figure 7:
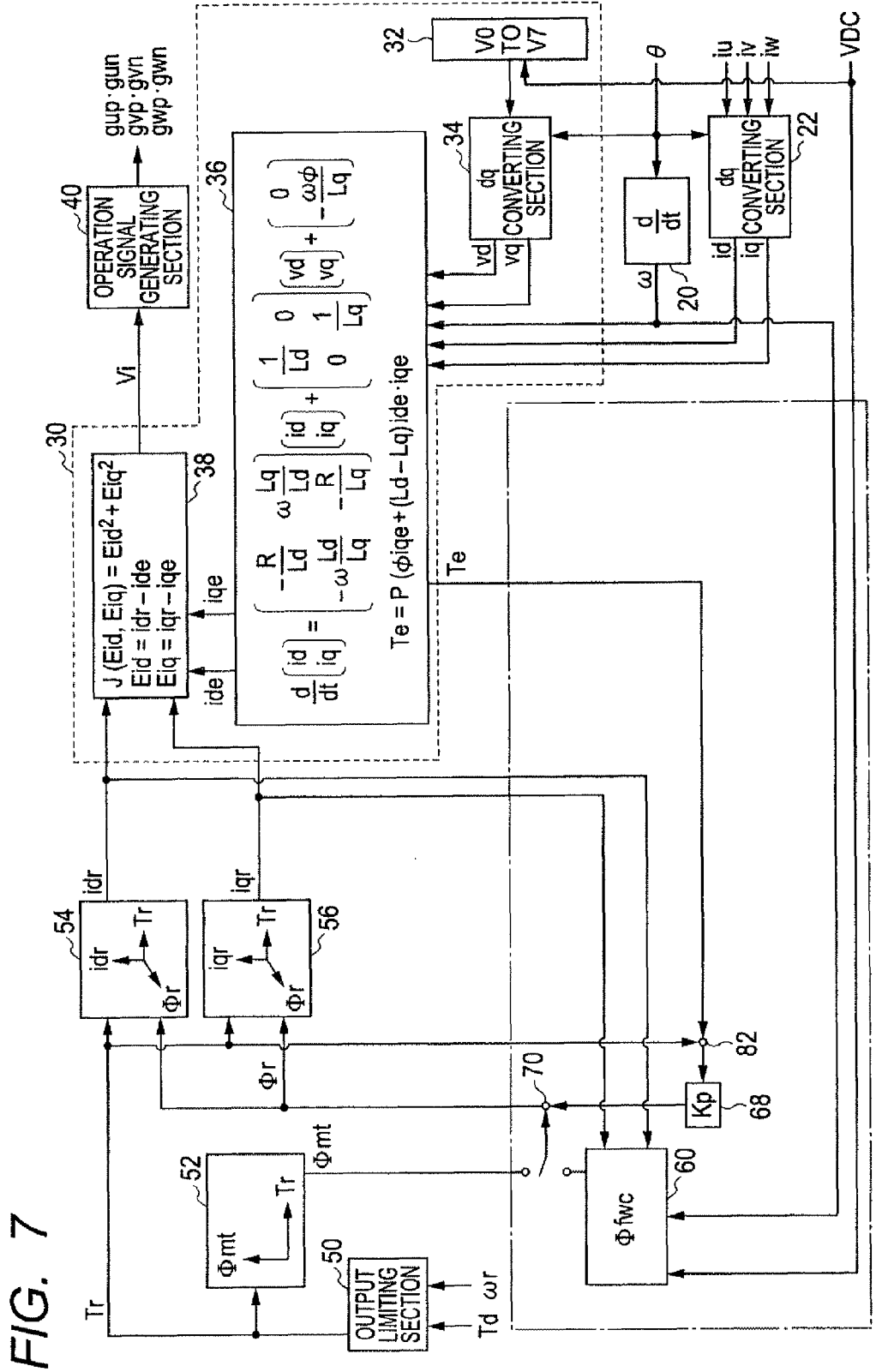
FIG. 7 is a functional block diagram explaining the operation of a control apparatus according to a fourth embodiment of the invention.

FIG. 7 is a functional block diagram explaining the process of the model predictive control performed in this embodiment. In FIG. 7, the same reference numerals or characters identical to those shown in FIG. 3 represent the same components.

As shown in FIG. 7, a deviation calculating section 82 subtracts the predicted torque Te from the torque command value Tr, and outputs the subtraction result to the proportional controller 68. The proportional controller 68 multiply the output value of the deviation calculating section 82, and outputs the multiplication result to the correcting section 70. Accordingly, the flux norm command value ωfwc is corrected by the manipulated variable of the torque feedback control.

The predicted torque Te can be calculated in accordance with the following equation (c13) by use of the predicted currents ide and iqe corresponding to the voltage vector Vi determined by the operating state determining section 38.

$$Te = P(\Phi qe(Ld-Lq)ideiqe) \qquad (c13)$$

According to the fourth embodiment, other than the above advantages (1) to (7) provided by the first embodiment, the following advantage can be obtained.

(10) The flux norm command value Φfwc is manipulated to feedback-control the torque of the motor-generator 10 at its command value. This makes it possible to prevent the actual torque of the motor-generator 10 from deviating from the torque command value.

Fifth Embodiment

Next, a fifth embodiment of the invention is described with particular emphasis on the difference with the fourth embodiment.

Figure 8:
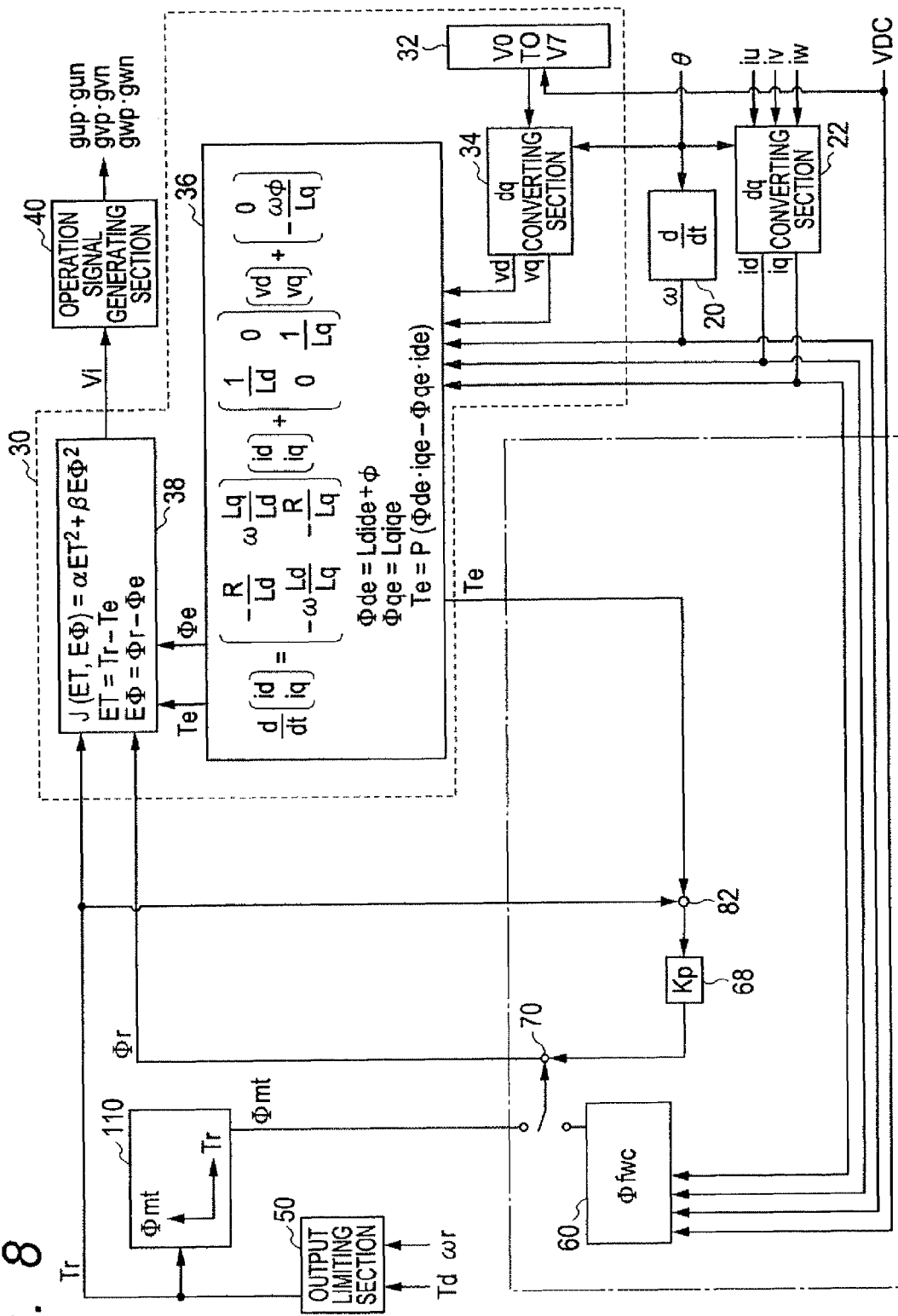
FIG. 8 is a functional block diagram explaining the operation of a control apparatus according to a fifth embodiment of the invention.

FIG. 8 is a functional block diagram explaining the process of the model predictive control performed in this embodiment. In FIG. 8, the same reference numerals or characters identical to those shown in FIG. 3 represent the same components.

In this embodiment, the torque and the flux linkage vector norm are used as input parameters of the evaluation function J. In more detail, the square of the difference between the torque command value Tr and the predicted torque Te is multiplied by a weighting factor α, and the square of the difference between a flux norm command value Φr and a predicted flux norm Φe is multiplied by a weighting factor β (α≠β) The sum of these weighted values is used as the evaluation function J. The reason of use of the weighting factors α and β is to adjust for the different units of the torque and the flux norm. For example, when the units of the torque and the current are set such that the torque is larger than the current in numerical value and accordingly the torque deviation is larger than the current deviation, there may occur a case where the evaluation by the evaluation function does not decrease significantly even when the voltage vector has a small control effect on the flux norm.

The predicted flux norm Φe is a norm of the predicted flux vector (Φde, Φqe) calculated by the following equations (c14) and (c15) on the basis of the predicted currents ide and iqe.

$$\Phi de = Ld \cdot ide + \phi \quad \text{(c14)}$$

$$\Phi qe = Lq \cdot iqe \quad \text{(c15)}$$

In this embodiment, the actual currents id and iq are inputted to the field weakening flux-command-value setting section 60 as input parameters instead of the command currents idr and iqr as the current flowing through the motor-generator 10.

Also according to the fifth embodiment described above, the advantages similar to the above advantages (1) to (6) provided by the first embodiment and the advantage (10) provided by the fourth embodiment can be obtained.

Sixth Embodiment

Next, a sixth embodiment of the invention is described with particular emphasis on the difference with the fifth embodiment.

The sixth embodiment additionally performs the process to feedback-control the magnitude of the output voltage of the inverter IV at the target value determined depending on the power supply voltage VDC as a process of the field weakening control.

Figure 9:
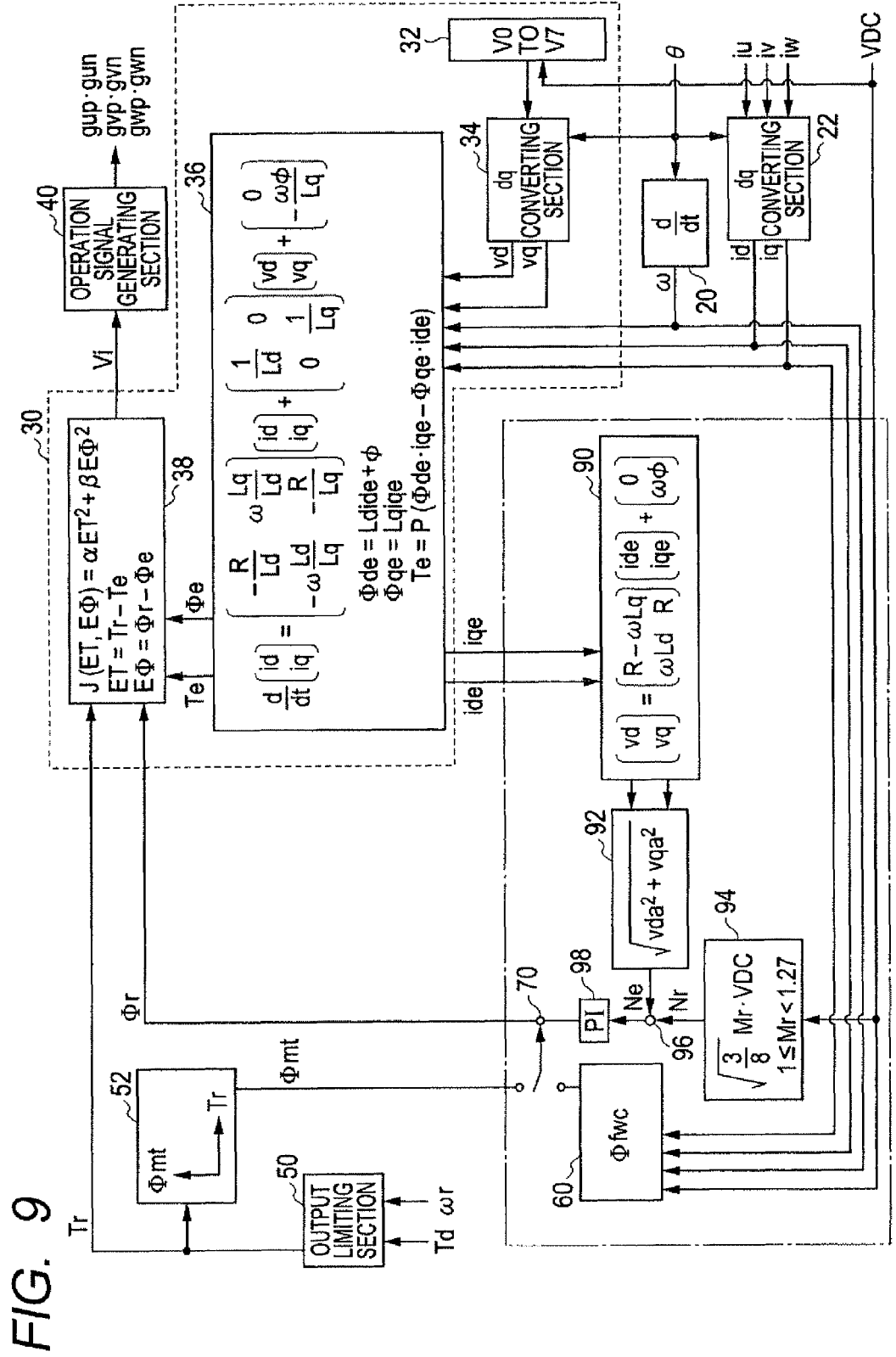
FIG. 9 is a functional block diagram explaining the operation of a control apparatus according to a sixth embodiment of the invention.

FIG. 9 is a functional block diagram explaining the process of the model predictive control performed in this embodiment. In FIG. 9, the same reference numerals or characters identical to those shown in FIG. 8 represent the same components.

An average voltage calculating section 90 receives the predicted currents ide and iqe from the predicting section 36, and calculates an average value vda of the voltage component on the d-axis, and an average value vqa of the voltage component on the q-axis. These average values can be calculated in accordance with the following model equations (c15) and (c16) which can be obtained by removing the differential operator terms from the model shown by the foregoing equations (c1) and (c2).

$$vda = R \cdot ide - \omega Lq \cdot iqe \quad \text{(c15)}$$

$$Vqa = \omega Ld \cdot ide + R \cdot iqe + \omega \phi \quad \text{(c16)}$$

Here, the predicted currents ide and iqe are regarded as predicted values corresponding to the operating state finally determined by the operating state determining section 38.

A voltage vector norm calculating section 92 calculates a norm having the average value of vda and vqa as an average voltage vector norm Ne. On the other hand, a norm target value setting section 94 set a target value Nr in accordance with the power supply voltage VDC inputted thereto. The target value Nr is the power supply voltage VDC multiplied by Mr·√(3/8). In this embodiment, the modulation index command value Mr is set larger than 1 and smaller than the modulation index of 1.27 in the rectangular wave control.

A norm deviation calculating section 96 subtracts the average voltage vector norm Ne from the norm target value Nr. A proportional integral controller 98 receives the output of the norm deviation calculating section 96, and outputs the result of the proportional integral operation. The output of the proportional integral controller 98 makes a manipulated variable to perform the feedback control to keep the average value of magnitude of the output voltage of the inverter IV at the target value.

The correcting section 70 calculates the final flux norm command value Φfwc by correcting the output of the maximum torque flux-command-value setting section 52 or the field weakening flux-command-value setting section 60 by the output of the proportional integral controller 98.

Figure 10:
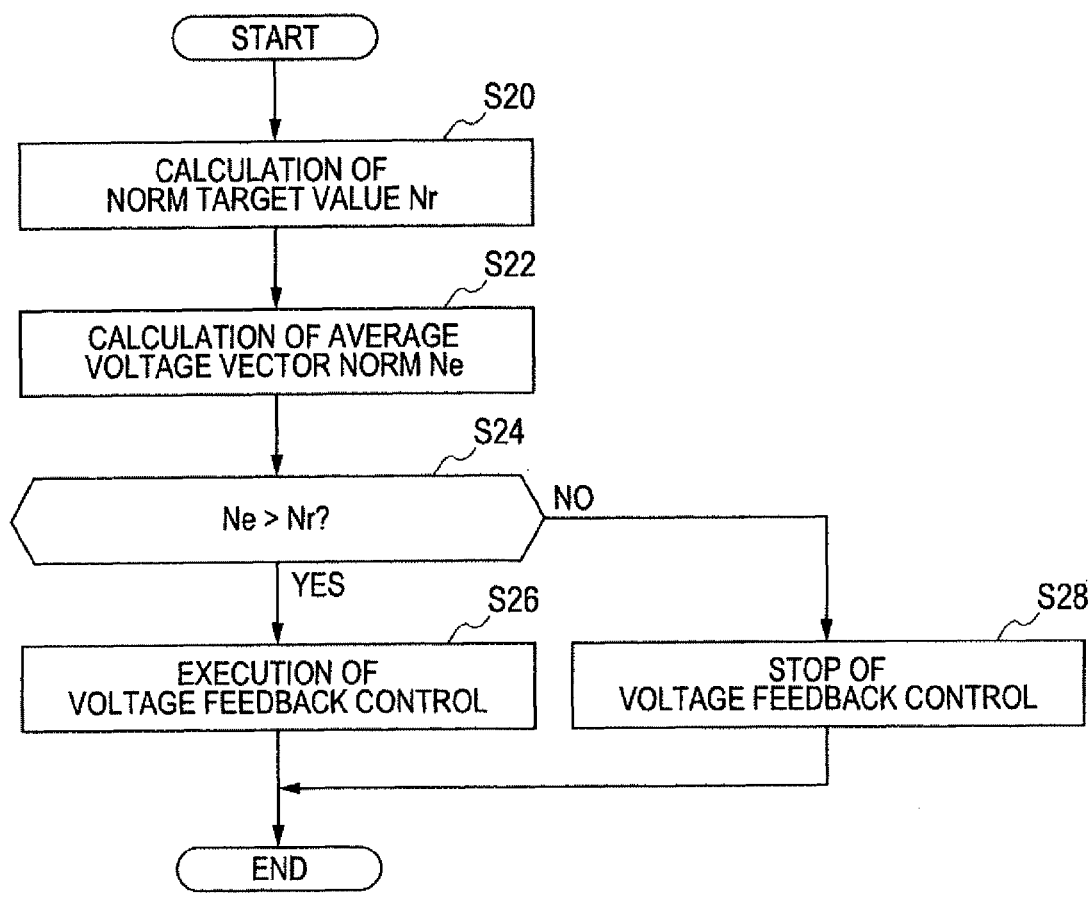
FIG. 10 is a flowchart showing the process of switching between a case where voltage feedback control is performed and a case where the voltage feedback control is not performed.

FIG. 10 is a flowchart showing the process to determine to perform or not to perform the feedback control of the average value of magnitude of the output voltage of the inverter IV.

This process is performed repeatedly at regular time intervals by the control device 14.

This process begins by calculating, at step S20, a norm target value Nr2 which is smaller than the norm target value Nr. At subsequent step S22, the average voltage vector norm Ne is calculated. At subsequent step S24, it is determined whether or not the average voltage vector norm Ne is larger than the norm target value Nr2. Step S24 is provided to determine whether or not the condition to start the feedback control of the average value of magnitude of the output voltage has been satisfied. If the determination result at step S24 is affirmative, the process proceeds to step S26 to perform the feedback control.

On the other hand, if the determination result at step S24 is negative, the process proceeds to step S28 to stop the feedback control. In view of the fact that the id current passed in the field weakening control mode is larger on the negative side than that passed in the maximum torque per ampere control mode, the limit values of the output and the integral term of the proportional integral controller 98 are set to 0 so that the output of the PI control does not become positive.

When step S26 or S28 is completed, this process is terminated.

According to the sixth embodiment, other than the advantages similar to the above advantages (1) to (6) provided by the first embodiment, the following advantage can be obtained.

(11) The flux norm command value Φfwc is manipulated to feedback-control the average value of magnitude of the inverter IV at the target value. This makes it possible to compensate for the control error of the feedforward control based on the flux norm command value Φfwc by performing the feedback control.

Seventh Embodiment

Next, a seventh embodiment of the invention is described with particular emphasis on the difference with the first embodiment.

The seventh embodiment additionally performs the process to feedback-control the flux linkage of the motor-generator 10 at the flux norm command value Φfwc as a process of the field weakening control.

Figure 11:
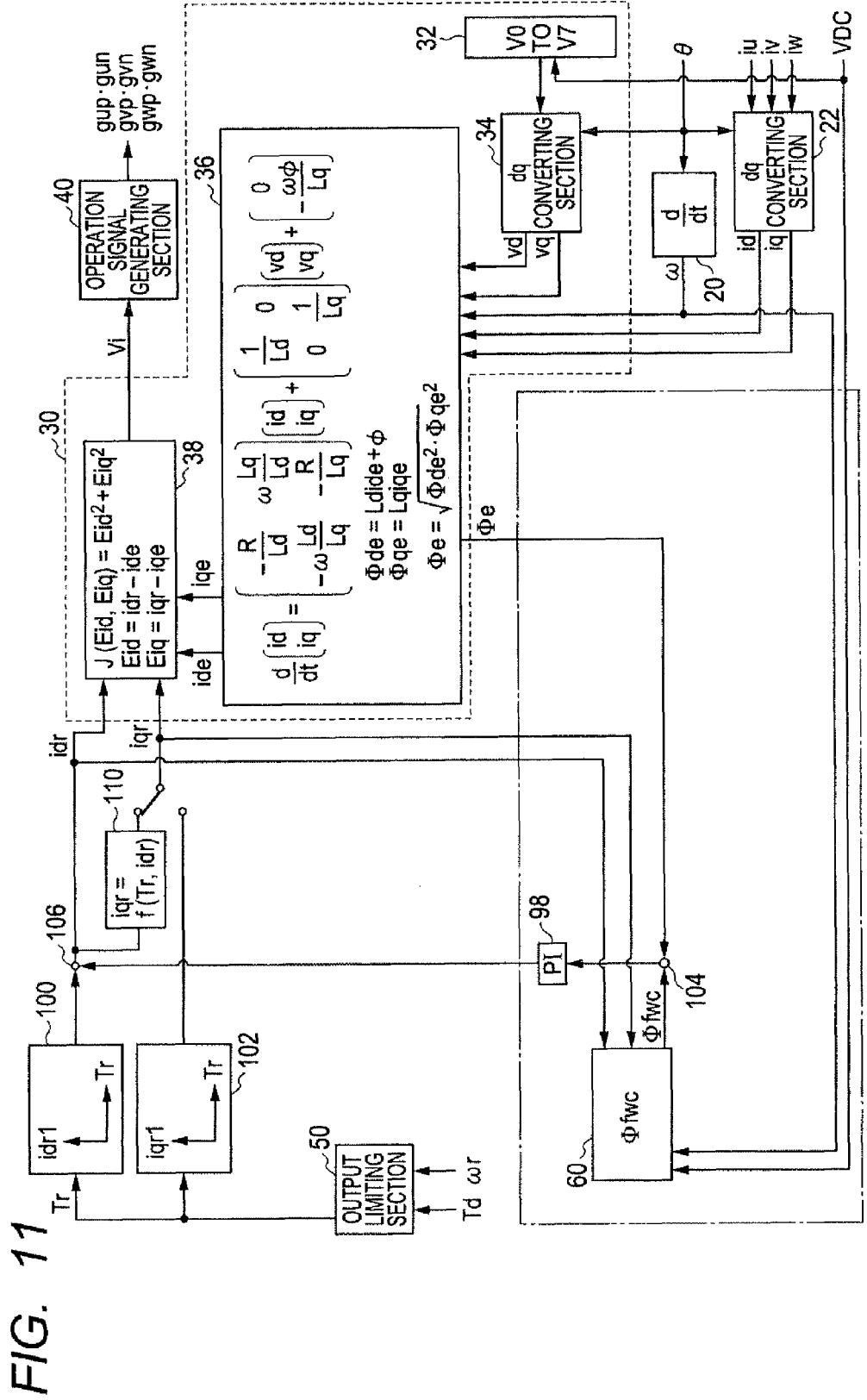
FIG. 11 is a functional block diagram explaining the operation of a control apparatus according to a seventh embodiment of the invention.

FIG. 11 is a functional block diagram explaining the process of the model predictive control performed in this embodiment. In FIG. 11, the same reference numerals or characters identical to those shown in FIG. 3 represent the same components.

A command current setting section 100 sets a command current idr1 to actualize the torque command value Tr and the maximum torque per ampere control. Another command current setting section 102 sets a command current iqr1 to actualize the command torque Tr and the maximum torque per ampere control. The command currents idr1 and iqr1 thus set are used as input parameters of the evaluation function J when the maximum torque per ampere control is performed.

On the other hand, the process to subtract the predicted flux norm Φe from the flux norm command value Φfwc is performed at a deviation calculating section 104 as a process of the field weakening control. The proportional integral controller 98 performs a proportional integral operation on the output of the deviation calculating section 104. A correcting section 106 corrects the command current iqr1 outputted from the command current setting section 100 by the output of the proportional integral controller 98. A q-axis current calculating section 110 calculates the command current iqr on the q-axis from the command current idr and the torque command value Tr. This is possible because one of the d-axis current and the q-axis current is determined from the other of them and the torque.

According to the seventh embodiment, other than the advantages similar to the advantages (1) to (5) provided by the first embodiment, the following advantage can be obtained.

(12) The flux linkage of the motor-generator 10 is feedback-controlled at the flux norm command value Φfwc.

This makes it possible to prevent deviation between the flux linkage of the motor-generator 10 and the command value.

Eighth Embodiment

Next, an eighth embodiment of the invention is described with particular emphasis on the difference with the seventh embodiment.

In this embodiment, the command currents are set instead of the flux norm command value Φfwc by the field weakening control.

Figure 12:
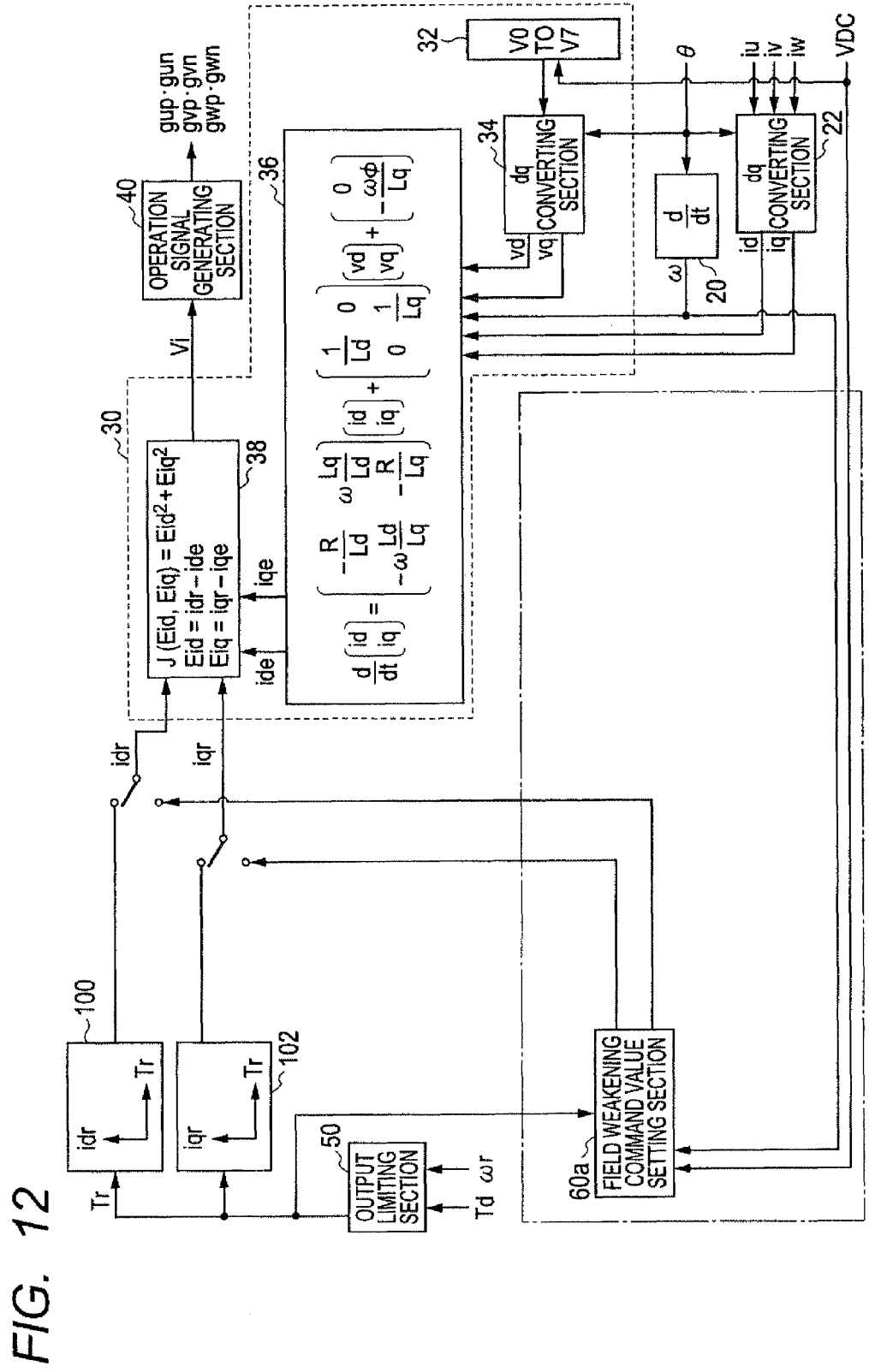
FIG. 12 is a functional block diagram explaining the operation of a control apparatus according to an eighth embodiment of the invention.

FIG. 12 is a functional block diagram explaining the process of the model predictive control performed in this embodiment. In FIG. 12, the same reference numerals or characters identical to those shown in FIG. 11 represent the same components.

A field weakening command value setting section 60a sets the command currents idr and iqr in accordance with the power supply voltage VDC and the torque command value Tr inputted thereto. This is possible by the provision of a map defining the relationship between each input parameter and the command current idr on the d-axis, and a map defining the relationship between each input parameter and the command current iqr on the q-axis. These maps are set to satisfy the condition to control the average value of magnitude of the output voltage of the inverter Iv at the target value.

Switching is performed between the command currents set by the command current setting sections 100 and 101, and the command currents set by the field weakening command value setting section 60a depending on which of the maximum torque per ampere control and the field weakening control is in operation. The process of this switching is shown by the flowchart of FIG. 10 in which "voltage feedback control" is replaced by "field weakening control".

Other Embodiments

It is a matter of course that various modifications can be made to the above embodiments as described below.

The first embodiment may be modified such that the command current setting sections 54 and 56 are not provided, and the torque and the flux linkage are set as the input parameters of the evaluation function. In the second embodiment, the current feedback control means is configured to be inputted with the sum of the square of the difference between the command currents idr and iqr and the square of the difference between the predicted currents ide and iqe. However, the current feedback control means may be configured to be inputted with the norm of the command currents idr and iqr, and the norm of the predicted currents ide and iqe. Further, the current feedback control means may be configured to be inputted with only the command current idr and the predicted current ide. The current feedback control means is not limited to the one constituted of only the proportional element. It may be the one constituted of only the integral element, or the one constituted of the proportional element and the integral element, or the one constituted of the proportional element, the integral element and the differential element.

The current feedback control means is not limited to the one configured to feedback-control the predicted currents ide and iqe at the command currents idr and iqr. It may be the one configured to feedback-control the actual currents id and iq at the command currents idr and iqr.

In the second embodiment, the input parameters of the evaluation function are the currents, however, they may be the flux and torque. Also in this case, if the command current setting sections 54 and 56 are provided, it is possible to constitute the current feedback control means in the same way as in the second embodiment.

In the third embodiment, although the terminal voltage deviation of the motor-generator 10 is calculated by use of the predicted currents ide and iqe, it may be calculated by use of the actual currents id and iq.

The third embodiment may be provided with the average voltage calculating section 90 provided in the sixth embodiment to calculate the terminal voltage deviation of the motor-generator 10.

In the third embodiment, the torque and the flux linkage may be set as the input parameters of the evaluation function.

The sixth embodiment may be provided with the command current setting sections 54 and 55 so that the input parameters of the evaluation function can be the currents.

In the sixth embodiment, although the condition to perform the voltage feedback control and the condition to set the flux norm command value Φfwc by the field weakening flux-command-value setting section 60 are set differently, they may be set the same. In this case, it is preferable to set the execution condition in accordance with the process shown in FIG. 4. However, it may be set in accordance with the process shown in FIG. 10.

The means to calculate the average value of magnitude of the output voltage of the inverter IV is not limited to the one that includes the average voltage calculating section 90. For example, it may be calculated by means to perform simple moving average process of the voltage vector Vi selected by the operating state determining section 38. However, in this case, it is necessary to make the sampling period of the voltage vector sufficiently shorter than the electrical angle period. Accordingly, the number of samplings may be variably, set so as to decrease with the increase of the electrical angular velocity.

Although the average value of magnitude of the output voltage is quantified as the average voltage vector norm Ne in the sixth embodiment, it may be quantified as the modulation index or voltage utilization rate. Also in this case, the same effect can be obtained by altering the gain of the proportional integral controller 98.

In the seventh embodiment, the command current idr on the d-axis is set as the manipulation object to feedback-control the predicted flux norm $\Phi e$ at the flux norm command value $\Phi fwc$ set by the field weakening flux-command-value setting section 60. However, the command current iqr on the q-axis may be set as the manipulation object.

In the seventh embodiment, the predicted flux norm $\Phi e$ is feedback-controlled at the flux norm command value $\Phi fwc$ set by the field weakening flux-command-value setting section 60. However, the magnitude of the actual flux linkage may be feedback-controlled.

In the seventh embodiment, the command current idr1 set by the command current setting section 100 is corrected by the manipulated variable as a correction amount to feedback control the predicted flux norm $\Phi e$ at the flux norm command value $\Phi r$ set by the field weakening flux-command-value setting section 60. However, the command current idr may be set as the manipulated variable as the correction amount.

The feedforward control means to control the average value of magnitude of the output voltage of the inverter IV at the target value set in accordance with the power supply voltage VDC is not limited to the one which sets one of the flux norm command value $\Phi r$ and the command currents idr and iqr. It may be the one which set both of them. In this case, both of them are set as the input parameters of the evaluation function.

In each of the embodiments, the controlled variables are calculated for each of all the voltage vectors V0 to V7. However, the controlled variables may be calculated for each of the zero vectors V1 to V6, and one of the non-zero vectors V0 and V7.

The controlled variables as the input parameters of the evaluation function J are not limited to the ones described in the embodiments. For example, they may be the fluxes $\Phi d$ and $\Phi q$ on the dq-axes. Further, they may be one of the fluxes $\Phi d$ and $\Phi q$ on the dq-axes, and the torque. Further, they may be the flux $\Phi d$ on the d-axis, and the current iq on the q-axis, or the flux $\Phi q$ on the q-axis, and the current id on the d-axis.

The evaluation function is not limited to the one which quantifies the deviation with respect to the command value of the controlled variable. For example, it may be tempered with the number of times that the operating state has been switched.

The means to adjust for the different units of the parameters inputted to the evaluation function J which are greatly different from each other in numerical value is not limited to the one which uses the weighting factors $\alpha$ and $\beta$. For example, the means may use the difference between the input parameters which have been normalized by the ratio to their maximums respectively instead of the difference in numerical value between the input parameters. In this case, the adjusting means is implemented by normalizing each parameter depending on the ratio to its maximum.

In each of the embodiments, each controlled variable expected to be at the next renewal timing (at the timing one control cycle ahead) determined by the operation of the inverter IV is predicted. However, the operating state of the inverter IV at the next renewing timing may be determined by sequentially predicting each controlled variable at the renewal timings up to several control cycles ahead.

The model used to predict the current is not limited to the one predicated on the fundamental wave. For example, a model including high order components with respect to the inductance or the induced voltage may be used as such a model. The means to predict the current may be the one that uses a map instead of the model equation. In this case, input parameters of the map may include the voltage (vd, vq), the electrical angular velocity $\omega$, and further the temperature. Here, the map means a storage means to store the values of the output parameters corresponding to the discrete values of the input parameters.

The means to predict the torque is not limited to the one described in the above embodiments. For example, the torque may be predicted by use of a map which is supplied with the predicted currents ide and iqe.

In each of the embodiments, the final controlled variable of the rotating machine (the controlled variable which is required to have the desired value irrespective of whether it is a prediction object or not) is the torque. However, it may be the rotational speed of the rotating machine.

In each of the embodiments, the target value is set to the average value of magnitude of the output voltage of the inverter IV when the modulation index is at the predetermined value larger than 1, and the input parameters of the evaluation function J are manipulated by the feedforward control to attain the target value. However, the target value may be set to the average value of magnitude of the output voltage of the inverter IV when the modulation index is smaller than 1, for example, at 0.9.

The model to predict the current is not limited to the one which neglects iron loss. A model which takes account of iron loss may be used as such a model.

The rotating machine is not limited to an IPMSM (Interior Permanent Magnet Synchronous Motor). For example, the rotating machine may be a surface permanent magnet synchronous machine, or a field winding synchronous machine. Further, the rotating machine is not limited to the synchronous rotating machine. For example, it may be an induction rotating machine such as an induction motor.

The rotating machine is not limited to the one mounted on a hybrid vehicle, and may be the one mounted on an electric vehicle. Further, the rotating machine is not limited to the one used as a main engine of a vehicle.

The DC power supply is not limited to the converter CV. For example, it may be the high voltage battery 12. In other words, the converter CV may be deleted from the structure shown in FIG. 1.

The power converter circuit is not limited to the inverter IV. For example, it may be the one which can apply a three-stage voltage to each of the terminals of the rotating machine. Also in this case, it is advantageous to perform the field weakening control as described in the above embodiments in the range where the modulation index exceeds 1 when the difference between the maximum and minimum of the voltage is used as the voltage of the DC power supply. Also, when only a part of the voltage is used intentionally, it is advantageous to perform the field weakening control in the range where the modulation index exceeds 1 when the difference between the maximum and minimum of the voltage is used as the voltage of the DC power supply.

The above explained preferred embodiments are exemplary of the invention of the present application which is described solely by the claims appended below. It should be understood that modifications of the preferred embodiments may be made as would occur to one of skill in the art.

What is claimed is:

1. A control apparatus for an electric rotating machine which controls a controlled variable including at least one of a current flowing through the electric rotating machine, a linkage flux of the electric rotating machine and a torque of the electric rotating machine by manipulating an output voltage of a power converter circuit including switching elements that electrically connect positive and negative terminals of a DC power source to terminals of the electric rotating machine, the control apparatus comprising:

a prediction means for predicting the controlled variable of the electric rotating machine for each of plural cases where an operating state of the power converter circuit is set in plural ways;

a manipulation means for determining an actual operating state of the power converter circuit based on an evaluation result of an evaluation function whose input parameters are the predicted controlled variable and a command value of the controlled variable, and manipulating the power converter circuit so that the determined operating state prevails; and a feedforward control means for manipulating the command value of the controlled variable as the input parameter in order to make an average value of magnitude of the output voltage of the power converter circuit equal to a target value set in accordance with the voltage of the DC power source, wherein the feedforward control means includes a calculating means for receiving the voltage of the DC power source and an electrical angular velocity of the electric rotating machine, and calculating the controlled variable of the electric rotating machine when the average value of magnitude of the output voltage of the power converter circuit becomes equal to the target value set in accordance with the voltage of the DC power source, the command value of the controlled variable as the input parameter being set to at least one of the controlled variable calculated by the calculating means and another controlled variable calculatable from the controlled variable.

2. The control apparatus for an electric rotating machine according to claim 1, wherein the controlled variable calculated by the calculating means is at least one of the current flowing through the electric rotating machine and the linkage flux of the electric rotating machine.

3. The control apparatus for an electric rotating machine according to claim 1, wherein the target value corresponds to the average value of magnitude of the output voltage when the modulation index has a value larger than 1.

4. The control apparatus for an electric rotating machine according to claim 1, wherein the target value is the average value of magnitude of the output voltage corresponding to a modulation index or below of rectangular wave control.

5. The control apparatus for an electric rotating machine according to claim 1, wherein control by the feedforward control means is started when the modulation index reaches a predetermined value larger than 1.

6. The control apparatus for an electric rotating machine according to claim 1, wherein the controlled variable calculated by the calculating means is magnitude of the linkage flux of the electric rotating machine, and the calculating means receives the current flowing through the electrical rotating machine in addition to the electrical angular velocity of the electrical rotating machine and the voltage of the DC power source, and calculates a command value of the linkage flux.

7. The control apparatus for an electric rotating machine according to claim 6, wherein the input parameters of the evaluation function are the torque and magnitude of the linkage flux of the electric rotating machine.

8. The control apparatus for an electric rotating machine according to claim 6, wherein the input parameters of the evaluation function are a d-axis current and a q-axis current of the electric rotating machine, and a command value of the d-axis current and a command value of the q-axis current as the input parameters are calculated based on the command value of the torque and the command value of the magnitude of the linkage flux of the electric rotating machine.

9. The control apparatus for an electric rotating machine according to claim 1, further comprising a torque feedback control means for manipulating the command value of the controlled variable as the input parameter manipulated by the feedforward control means in order to feedback-control the torque of the electric rotating machine at the command value of the torque.

10. The control apparatus for an electric rotating machine according to claim 1, further comprising a current feedback control means for manipulating the command value of the controlled variable as the input parameter manipulated by the feedforward control means in order to feedback-control the current flowing through the electric rotating machine at the command value.

11. The control apparatus for an electric rotating machine according to claim 6, further comprising a correcting means for receiving the current flowing through the electric rotating machine and its command value, and if a terminal voltage of the electric rotating machine calculated from the current flowing through the electric rotating machine is larger than a terminal voltage of the electric rotating machine calculated from the command value, correcting the command value of the magnitude of the linkage flux calculated by the calculating means in order to reduce a voltage depending on a difference therebetween.

12. The control apparatus for an electric rotating machine according to claim 1, further comprising a voltage feedback control means for manipulating the command value of the controlled variable as the input parameter manipulated by the feedforward control means in order to feedback-control the average value of the magnitude of the output voltage of the power converter circuit at the target value.

13. The control apparatus for an electric rotating machine according to claim 6, further comprising a flux feedback control means for feedback-controlling the magnitude of the linkage flux at the command value of the magnitude of the linkage flux manipulated by the calculating means.

14. The control apparatus for an electric rotating machine according to claim 6, further comprising a maximum torque control means for calculating a command value of the magnitude of the linkage flux to generate a maximum torque while minimizing the current flowing through the electric rotating machine, control by the feedforward control means being used when a linkage flux smaller than the linkage flux set by the maximum torque control means is given as a command value.

* * * * *